(12) United States Patent
Katou et al.

(10) Patent No.: US 6,488,137 B2
(45) Date of Patent: Dec. 3, 2002

(54) INPUT CLUTCH LUBRICATION CONTROL APPARATUS FOR AN AUTOMATIC TRANSMISSION

(75) Inventors: Yoshiaki Katou, Kanagawa (JP); Takanori Kanehisa, Tokyo (JP)

(73) Assignees: Nissan Motor Co., Ltd., Yokohama (JP); Jatco Transtechnology Ltd., Fuji (JP)

(*) Notice: Subject to any disclaimer, the term of this patent is extended or adjusted under 35 U.S.C. 154(b) by 0 days.

(21) Appl. No.: 09/874,286

(22) Filed: Jun. 6, 2001

(65) Prior Publication Data

US 2002/0000353 A1 Jan. 3, 2002

(30) Foreign Application Priority Data

Jun. 30, 2000 (JP) .......................................... 2000-198263

(51) Int. Cl.[7] .............................................. F16D 13/74
(52) U.S. Cl. .................................. 192/70.12; 192/113.35
(58) Field of Search ........................ 192/70.12, 113.35, 192/35, 84.7, 84.91

(56) References Cited

U.S. PATENT DOCUMENTS

| | | | | |
|---|---|---|---|---|
| 4,157,750 A | * | 6/1979 | Horsch | .................. 192/113.35 |
| 4,519,373 A | * | 5/1985 | Hardy et al. | .......... 192/70.12 X |
| 5,230,664 A | * | 7/1993 | Michioka et al. | .............. 474/43 |
| 5,701,986 A | * | 12/1997 | Lorriette | ................... 192/70.12 |
| 5,915,513 A | * | 6/1999 | Isley, Jr. et al. | ............... 192/35 |
| 6,012,560 A | * | 1/2000 | Kuroda et al. | ................. 192/35 |

FOREIGN PATENT DOCUMENTS

| | | | | |
|---|---|---|---|---|
| JP | 58-102827 A | * | 6/1983 | ............ 192/113.35 |
| JP | 5-149418 | | 6/1993 | |
| JP | 10-078052 | | 3/1998 | |

* cited by examiner

Primary Examiner—Richard M. Lorence
(74) Attorney, Agent, or Firm—Foley & Lardner

(57) ABSTRACT

An input clutch lubrication control apparatus for an automatic transmission, including an oil pump, a sleeve, an input shaft rotatably supported by the sleeve, an electromagnetic input clutch drivingly coupled with the input shaft upon being applied, first and second lubrication circuits fluidly communicating the electromagnetic input clutch with the oil pump, and a controller programmed to control the first and second lubrication circuits to regulate an amount of the lubricating oil fed to the electromagnetic input clutch. First lubrication circuit includes an annular space between the input shaft and the sleeve. Second lubrication circuit includes an axial bore of the input shaft.

20 Claims, 5 Drawing Sheets

INPUT CLUTCH LUBRICATION CONTROL APPARATUS FOR AN AUTOMATIC TRANSMISSION

BACKGROUND OF THE INVENTION

The present invention relates to an apparatus for controlling lubrication in an input clutch used in an automatic transmission, and specifically, to an apparatus for controlling lubrication in an electromagnetic input clutch.

In general, an automatic transmission of a continuously variable type (stepless transmission) or a non-continuously variable type (stepwise transmission) is so constructed as to receive rotation of an engine as a power source via a torque converter. The torque converter transmits the power between input and output elements by hydrodynamic force. The torque converter can perform smooth transmission of the power, but there will occur slippage between the input and output elements, causing decrease in fuel economy.

In order to eliminate the above-described disadvantage, there have been proposed automatic transmissions in which an input clutch constituted by an electromagnetic clutch or multiple-disc clutch is used in place of a torque converter. Japanese Patent Applications First Publications Nos. 10-78052 and 5-149418 disclose an automatic transmission including a multiple-disc clutch substituted for a torque converter. The multiple-disc clutch has a relatively large size, and requires such a complicated hydraulic circuit for controlling the clutch application as described in the latter of the earlier techniques. This results in enlarged size and complicated construction of the automatic transmission. In addition, if the multiple-disc clutch is substituted for the torque converter in the automatic transmission, a large change of the design of the automatic transmission must be required. Therefore, it is preferable to use the electromagnetic clutch rather than the multiple-disc clutch.

However, even when the electromagnetic clutch is used for the input clutch, it is required to apply the input clutch at a slipping state in order to prevent undesired shock from being caused upon the starting or speed-change operation of the automatic transmission. Accordingly, the electromagnetic input clutch must be lubricated.

The lubrication circuit of the electromagnetic input clutch includes an oil pump for pumping a lubricating oil from an oil source. The oil pump is disposed at the connection between a transmission casing and an input clutch housing. A control valve body is mounted to a lower portion of the transmission casing and adapted to control speed-change of the automatic transmission using the oil fed from the oil pump as a working medium. An excessive oil from the control valve body is utilized for lubricating the electromagnetic input clutch within the input clutch housing. The lubricating oil to be used for lubrication of the electromagnetic input clutch must be supplied from the central portion of the input clutch because the input clutch per se is a rotor. Therefore, the lubrication circuit cannot be formed at the outer periphery of the input clutch. For the reasons described above, the formation of the lubrication circuit tends to increase diameter of a transmission input shaft and radial dimension of the entire automatic transmission.

Further, if two lubrication circuits for the input clutch are arranged parallel to each other and selectively used for easy control of an amount of the lubricating oil, the above-described tendency will become more significant. There is a demand for providing the solution of the above problem.

SUMMARY OF THE INVENTION

An object of the present invention is to provide an apparatus for controlling lubrication in an input clutch of an automatic transmission, which is provided with two parallel lubrication circuits for the input clutch without increasing radial dimensions of a transmission input shaft and the automatic transmission and is capable of readily controlling an amount of a lubricating oil to be used for lubrication in the input clutch.

A further object of the present invention is to provide an apparatus for lubricating an electromagnetic input clutch of an automatic transmission, which is capable of being constructed without substantially changing the design of the automatic transmission utilizing a torque converter.

According to one aspect of the present invention, there is provided an input clutch lubrication control apparatus for au automatic transmission, comprising:

an oil pump discharging a lubricating oil;

a sleeve;

an input shaft having an axial bore, the input shaft rotatably supported by the sleeve;

an electromagnetic input clutch electromagnetically operated to be drivingly coupled with the input shaft upon being applied;

a first lubrication circuit feeding the lubricating oil discharged from the oil pump to the electromagnetic input clutch, the first lubrication circuit including a space between an outer circumferential surface of the input shaft and an inner circumferential surface of the sleeve; and a second lubrication circuit feeding the lubricating oil discharged from the oil pump to the electromagnetic input clutch, the second lubrication circuit including the axial bore of the input shaft; and a controller programmed to control the first and second lubrication circuits to regulate an amount of the lubricating oil fed to the electromagnetic input clutch.

According to a further aspect of the present invention, there is provided an input clutch lubrication control apparatus for au automatic transmission, comprising:

an oil pump discharging a lubricating oil;

a sleeve;

an input shaft rotatably received by the sleeve with a space therebetween, the input shaft having an axial bore;

an electromagnetic input clutch electromagnetically operated to be drivingly coupled with the input shaft upon being applied;

first lubrication passage means for fluidly communicating the electromagnetic input clutch with the oil pump through the space between the sleeve and the input shaft;

second lubrication passage means for fluidly communicating the electromagnetic input clutch with the oil pump through the axial bore of the input shaft; and a controller programmed to control the first and second lubrication passage means depending on an operating state of the electromagnetic input clutch.

According to a still further aspect of the present invention, there is provided an automatic transmission, comprising:

an oil pump discharging a lubricating oil;

a sleeve;

an input shaft rotatably supported by the sleeve;

an electromagnetic input clutch electromagnetically operated to be drivingly coupled with the input shaft upon being applied;

first and second lubrication circuits fluidly communicating the electromagnetic input clutch with the oil pump and arranged parallel to each other; and a controller programmed to perform either one of a mono-circuit lubrication control in which the first lubrication circuit is used and a bi-circuit lubrication control in which the first and second lubrication circuits are used, depending on an operating state of the electromagnetic input clutch.

DETAILED DESCRIPTION OF THE PREFERRED EMBODIMENTS

Figure 1:
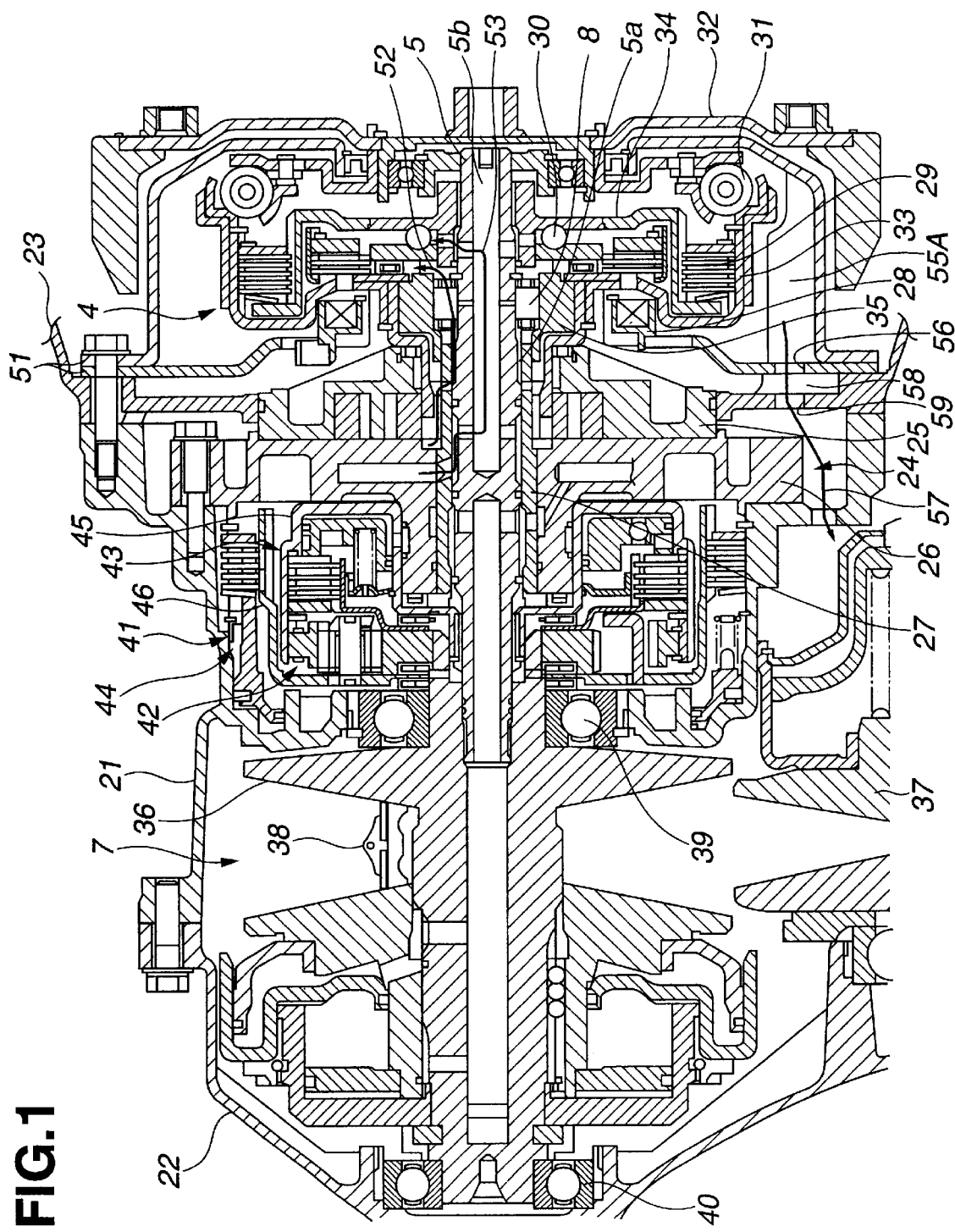
FIG. 1 is a cross-sectional view of a part of an automatic transmission to which an apparatus of the present invention is incorporated, taken along an axis of an input shaft.

Referring now to FIG. 1, there is shown an automatic transmission to which an apparatus for controlling lubrication in an input clutch, of a preferred embodiment according to the present invention, is incorporated. In this embodiment, the automatic transmission is in the form of a V-belt continuously variable transmission (CVT) including speed change section 7 as explained later.

As illustrated in FIG. 1, the V-belt CVT includes transmission casing 21, end cover 22 closing a rear end opening of transmission casing 21, and input clutch housing 23 attached to a front end opening of transmission casing 21. Oil pump 24 is disposed between transmission casing 21 and input clutch housing 23. Oil pump 24 is in the form of a gear pump which includes pump housing 25, pump cover 26 cooperating with pump housing 25 to define a space therebetween, and an internal gear pump element disposed within the space.

Stationary sleeve 27 is received into a central opening of pump cover 26 in a fitting relation to an inner circumferential surface of pump cover 26 which defines the central opening. Input. shaft 5 is rotatably supported by sleeve 27.

Input clutch 4 is mounted onto a front portion of input shaft 5 which projects into an inside of input clutch housing 23. Input clutch 4 is electromagnetically operated and includes electromagnetic clutch 28, input clutch pack 29 disposed on an outer periphery of electromagnetic clutch 28, and loading cam 30 disposed on an inner periphery of electromagnetic clutch 28. Electromagnetic clutch 28 is adapted to transmit rotation of clutch drum 33 to loading cam 30 when electromagnetic clutch 28 is in an applied or engaged state. Clutch drum 33 is drivingly connected to an engine crankshaft (not shown) via torsional damper 31 and drive plate 32. Clutch drum 33 acts as a drive shaft of oil pump 24.

When loading cam 30 receives engine rotation upon application of electromagnetic clutch 28, loading cam 30 exhibits cam function by the rolling contact between balls and a sloped cam surface. A thrust force is caused and exerted on input clutch hub 34 splined to input shaft 5, to the right side in FIG. 1. Input clutch hub 34 is moved in the direction to urge input clutch pack 29 by an outer circumferential portion thereof. Input clutch pack 29 is brought into an engaged state in which input clutch hub 34 is coupled with clutch drum 33. In this condition, input clutch 4 is in an applied state in which input clutch 4 transmits the engine rotation to input shaft 5 through clutch drum 33, input clutch pack 29 engaged, and input clutch hub 34.

One-way clutch 8 is fitted to input shaft 5 between oil pump 24 and loading cam 30. Annular member 35 is rotatively engaged with an outer circumferential surface of one-way clutch 8 and secured to a front end portion of stationary sleeve 27. Annular member 35 and sleeve 27 act as a reaction force receiving member for one-way clutch 8 which prohibits a rotation of input shaft 5 reverse to the engine rotation so that one-way clutch 8 can effect a hill-hold function for preventing the vehicle from rolling on a slope.

Speed change section 7 includes primary pulley 36, secondary pulley 37 and V-belt 38 connecting primary and secondary pulleys 36 and 37. Primary pulley 36 is fitted onto a rear end portion of input shaft 5 which projects into transmission casing 21. Primary pulley 36 has a front end supported on transmission casing 21 through bearing 39 and a rear end supported on end cover 22 through bearing 40. Each of primary and secondary pulleys 36 and 37 defines a V-groove engaged with V-belt 38 and is controllable to change a width of the V-groove which extends in the axial direction of input shaft 5. A radius of curvature of a circular arc formed by V-belt 38 spanned on pulleys 36 and 37 is continuously changed by changing the V-groove width. Speed change section 7 can thus conduct a continuously variable transmission operation. Rotation output with speed change is transmitted from secondary pulley 37 to drive wheels via differential gears (not shown).

Forward-reverse switching mechanism 41 is disposed at the connection where input shaft 5 and primary pulley 36 are coupled with each other. Forward-reverse switching mechanism 41 includes simple planetary gear set 42, wet multiple-disc forward clutch 43 and reverse brake 44. Simple planetary gear set 42 includes a ring gear drivingly coupled with input shaft 5 via clutch drum 45 of forward clutch 43 so as to act as an input element, a sun gear drivingly coupled with primary pulley 36 so as to act as an output element, and a carrier connected with hub 46 of reverse brake 44 so as to act as a reaction force receiving member. Forward clutch 43 is operative to make simple planetary gear set 42 as one unit by drivingly connecting the ring gear and the sun gear when forward clutch 43 is engaged, to thereby transmit rotation of input shaft 5 to primary pulley 36 for forwardly driving the vehicle. Reverse brake 44 is operative to activate the carrier of simple planetary gear set 42 as the reaction force receiving member by fixing the carrier, to thereby transmit reduced reverse rotation of input shaft 5 to primary pulley 36 for reversely driving the vehicle.

Thus-constructed automatic transmission shown in FIG. 1 is operated as follows. When non-travel range such as a neutral (N) range and a parking (P) range is selected, electromagnetic clutch 28 is deenergized to be in OFF position and thus input clutch 4 is in the released state. Forward clutch 43 and reverse brake 44 as start friction elements are in the released state with the working pressure drained. In this condition, the engine rotation is prevented from being transmitted to primary pulley 36 so that the vehicle is stopped.

When a driving (D) range is selected, forward clutch 43 is applied with hydraulic pressure. Electromagnetic clutch 28 is then energized to be in the applied state in which loading cam 30 effects the cam function to bring input clutch 4 into the applied state. The engine rotation is transmitted to input shaft 5 via input clutch 4 applied, and then transmitted to primary pulley 36 of speed change section 7 via forward clutch 43 applied and simple planetary gear set 42. Speed change section 7 continuously variably transmits the rotation to the wheels so that the vehicle forwardly runs. If electromagnetic clutch 28 is gradually energized at the start so as to control a rate of application thereof, the vehicle can smoothly start in the forward direction.

When a reverse (R) range is selected, reverse brake 44 is applied with hydraulic pressure. Then, electromagnetic clutch 28 is energized to be in the applied state so that loading cam 30 effects the cam function to make input clutch 4 applied. The engine rotation is transmitted to input shaft 5 via input clutch 4 applied. The engine rotation transmitted to input shaft 5 is reduced in the reverse direction by reverse brake 44 applied and planetary gear set 42 and then transmitted to primary pulley 36 of speed change section 7. The rotation is continuously variably transmitted by speed change section 7 to the wheels of the vehicle. The vehicle is driven in the reverse direction. If the energization of electromagnetic clutch 28 is gradually carried out at the start so as to control the rate of application of electromagnetic clutch 28, the reverse travel of the vehicle can smoothly start.

Lubrication in input clutch 4 will be explained hereinafter. Input clutch 4 is enclosed in stationary input clutch casing 51 with the lubricating oil. Input clutch casing 51 is secured to the front end opening of transmission casing 21 together with input clutch housing 23. Input clutch casing 51 and input clutch housing 23 are mounted to transmission casing 21 in such a manner that the lubricating oil within input clutch casing 51 is prevented from leaking to input clutch housing 23.

There are provided first lubrication circuit or passage 52 and second lubrication circuit or passage 53 fluidly communicating input clutch 4 with oil pump 24 for lubricating input clutch 4. First and second lubrication circuits 52 and 53 are arranged in parallel relation to each other. First lubrication circuit 52 includes annular space 5a disposed at the connection in which a front reduced-diameter portion of input shaft 5 is fitted into sleeve 27. Annular space 5a is formed between an inner circumferential surface of sleeve 27 and an outer circumferential surface of the reduced-diameter portion of input shaft 5. Annular space 5a is communicated with oil pump 24 and input clutch 4 via radial ports formed in sleeve 27. Second lubrication circuit 53 includes axial bore 5b of input shaft 5. Axial bore 5b is communicated with input clutch 4 via a radial port formed in input shaft 5 and communicated with oil pump 24 via radial ports formed in input shaft 5 and sleeve 27. Here, an inlet fluid circuit for lockup control of conventional torque converter transmissions may be suitably used as first lubrication circuit 52 for input clutch 4. Also, an outlet fluid circuit for lockup control of the conventional torque converter transmissions may be suitably used as second lubrication circuit 53 for input clutch 4. After completion of lubrication of input clutch 4, the lubricating oil is collected by a plurality of oil catching ribs 55A which are formed in input clutch casing 51 as shown in FIG. 2.

Figure 2:
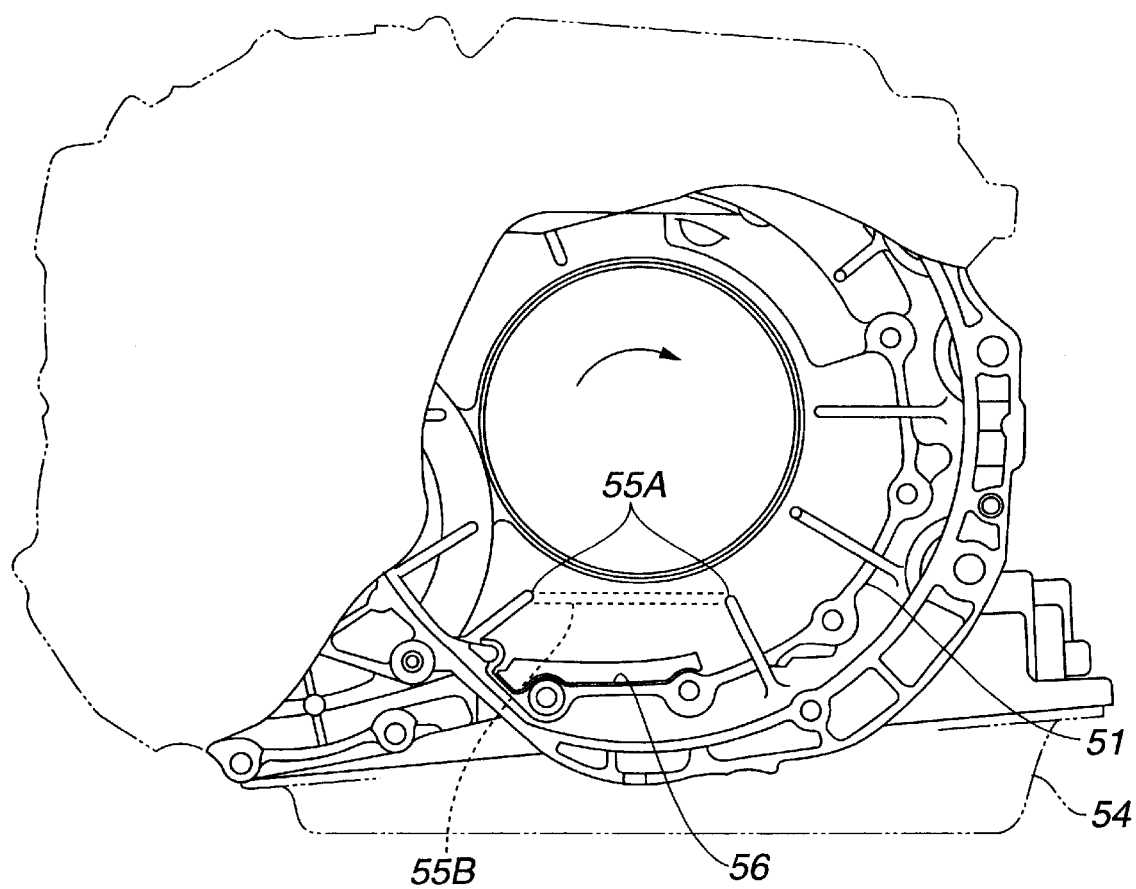
FIG. 2 is a fragmentary view of the automatic transmission as viewed from an engine side, showing an inside of an input clutch.

As illustrated in FIG. 2, oil catching ribs 55A are disposed inside a lower portion of input clutch casing 51. The lubricating oil that has lubricated input clutch 4 is collected in a space defined between oil catching ribs 55A. Oil catching ribs 55A uprightly and radially extend from an inner peripheral surface of input clutch casing 51. Oil catching ribs 55A are spaced from each other in a direction of rotation of input clutch 4 as indicated by arrow of FIG. 2. There may be provided connection rib 55B connecting the adjacent two of oil catching ribs 55A and cooperating therewith to define an oil collecting space, as indicated by broken line in FIG. 2. A rear wall of input clutch casing 51 is formed with opening 56 through which the lubricating oil collected between oil catching ribs 55A flows out of input clutch casing 51. Opening 56 constitutes a part of oil return passage 57 shown in FIG. 1.

Oil return passage 57 returns the lubricating oil collected after completion of the lubrication of input clutch 4, to oil pan or oil receiver 54 shown in FIG. 2. Oil return passage 57 includes oil guide rib 58 and opening 59 which are formed in input clutch housing 23 as shown in FIG. 1.

Figure 3:
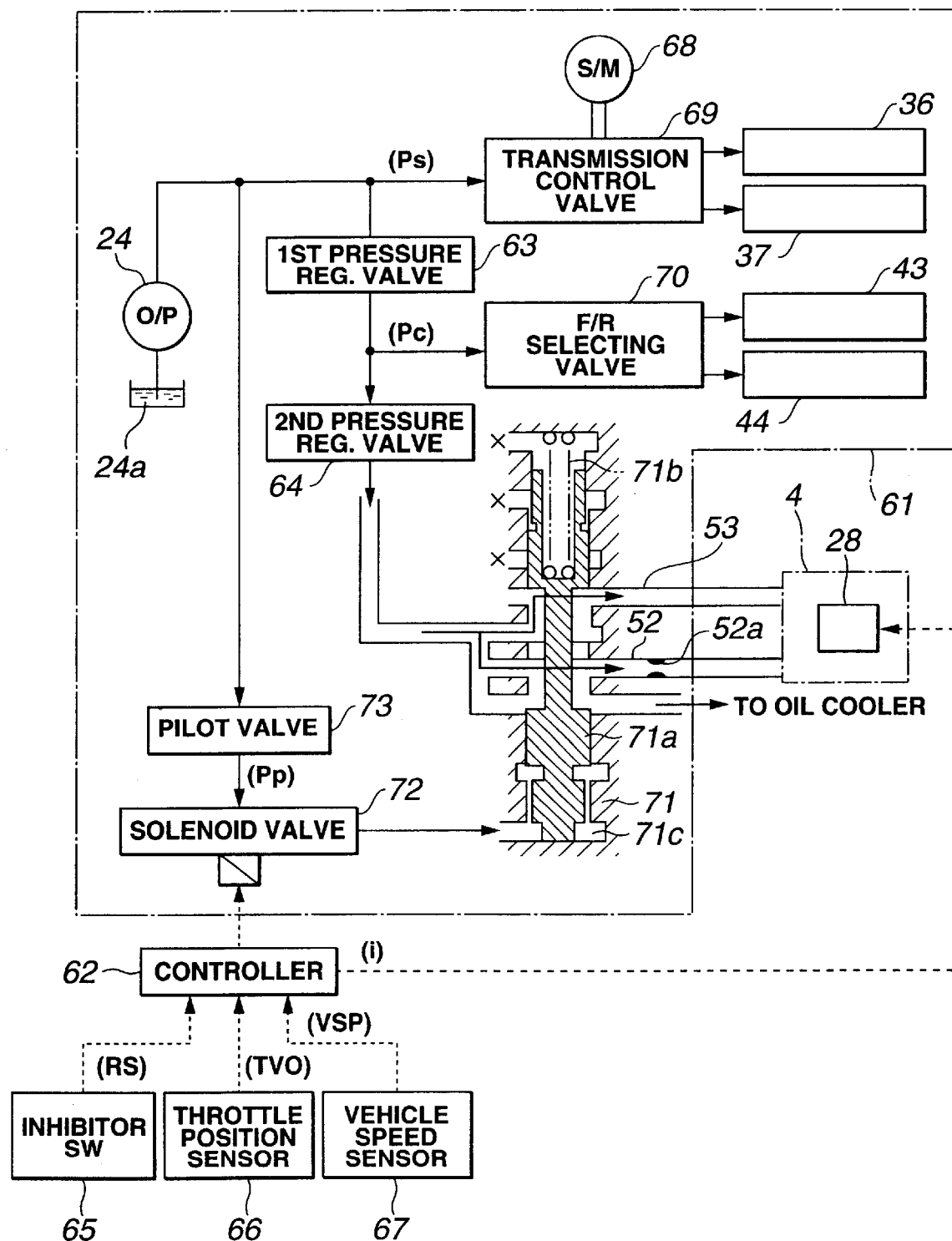
FIG. 3 is a schematic block diagram of a transmission control system used in the automatic transmission.

Referring now to FIG. 3, there is shown a block diagram for explaining various controls conducted by controller 62 through transmission control section 61. Controller 62 includes a microcomputer incorporating central processor unit (CPU), input ports, output ports, read-only memory (ROM) for storing the control program, random access memory (RAM) for temporary data storage, and a conventional data bus.

As illustrated in FIG. 3, transmission control section 61 includes first pressure regulating valve 63, second pressure regulating valve 64, transmission control valve 69 and forward-reverse selecting valve 70. First pressure regulating valve 63 creates transmission control pressure Ps using lubricating oil 24a as a working medium which is discharged from oil pump 24. Transmission control valve 69 controls primary and secondary pulleys 36 and 37 so as to adjust the V-groove widths thereof using transmission control pressure Ps as initial pressure in accordance with a target gear ratio determined by controller 62. Controller 62 receives signal outputs RS, TVO and VSP which are generated from inhibitor switch 65, throttle position sensor 66 and vehicle speed sensor 67, respectively. Signal output RS indicates the range selected from ranges P, N, D and R by a vehicle operator. Signal output TVO indicates a throttle opening degree corresponding to the throttle position. Signal output VSP indicates a vehicle speed. Controller 62 calculates the target gear ratio on the basis of signal outputs RS, TVO and VSP. Controller 62 operates stepping motor 68 so as to move transmission control valve 69 to the valve position corresponding to the target gear ratio, in which suitable V-groove widths of primary and secondary pulleys 36 and 37 are given.

Second pressure regulating valve 64 creates forward-reverse selecting pressure Pc using an excess of the lubricating oil discharged from first pressure regulating valve 63. Forward-reverse selecting valve 70 is mechanically operated depending on the range selected by the vehicle operator. When P range or N range is selected, forward clutch 43 and reverse brake 44 are released so that the vehicle can be at a stop. When D range is selected, forward clutch 43 is applied by forward-reverse selecting pressure Pc such that the vehicle can forwardly run. When R range is selected, reverse brake 44 is applied by forward-reverse selecting pressure Pc such that the vehicle can reversely run.

Controller 62 carries out application/release control of electromagnetic clutch 28, namely, application/release control of input clutch 4, depending on signal output RS from inhibitor switch 65. When controller 62 determines that N range or P range is selected, controller 62 deenergizes electromagnetic clutch 28. Electromagnetic clutch 28 is thus released so that input clutch 4 is in the released state. In the released state of input clutch 4, forward clutch 43 and reverse brake 44, the vehicle can be at a stop. When controller 62 determines that D range or R range is selected, controller 62 provides electromagnetic clutch 28 with electric current i shown in FIG. 3, so as to apply electromagnetic clutch 28 and apply input clutch 4. In the applied state of input clutch 4, and forward clutch 43 or reverse brake 44, the vehicle can run in the forward or reverse direction. At the start, controller 62 gradually increases electric current i supplied to electromagnetic clutch 28, so as to regulate the application rate of electromagnetic clutch 28 for smooth start of the forward or reverse travel of the vehicle.

Figure 4:
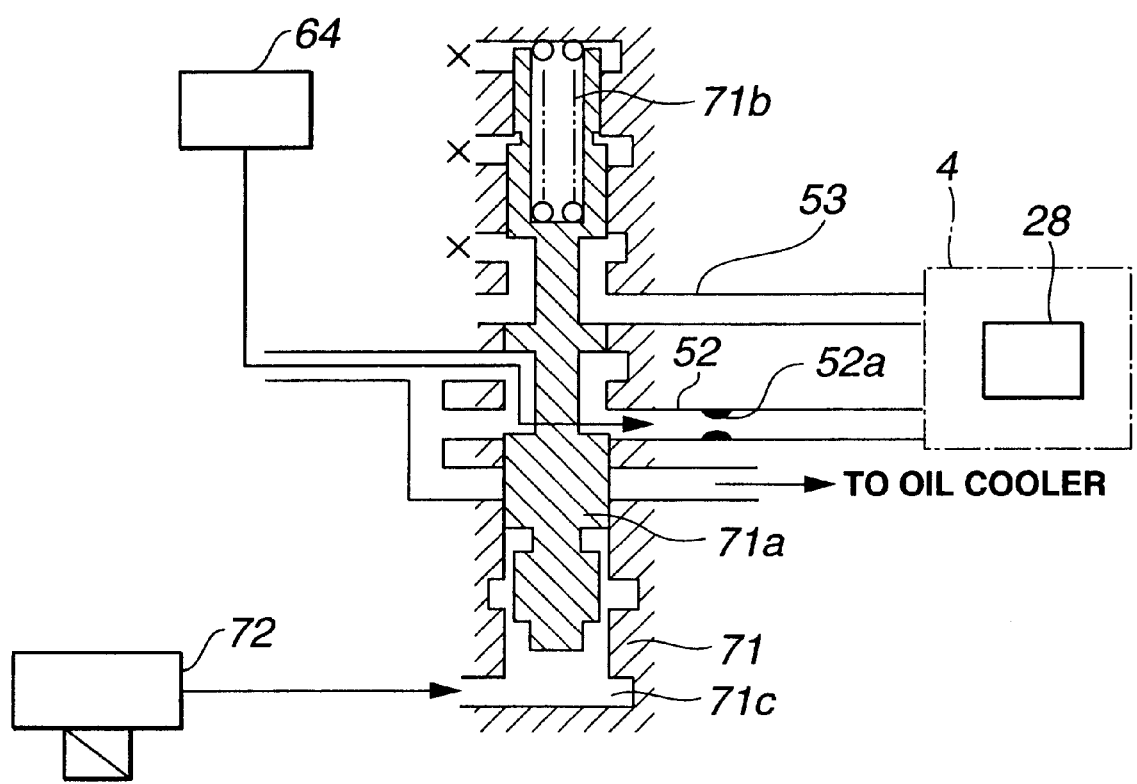
FIG. 4 is a partially enlarged diagram of FIG. 3, showing a lubrication control valve in an operating position.

Controller 62 also carries out lubrication control of input clutch 4 by operating lubrication control valve 71, solenoid valve 72 and pilot valve 73 which are provided at transmission control section 61. Lubrication control valve 71 includes spool 71a, a spool bore receiving spool 71a, and spring 71b biasing spool 71a in one direction within the spool bore. Spool 71a defines pressure-apply chamber 71c at one axial end thereof in cooperation with the spool bore. The spool bore is fluidly communicated with second pressure regulating valve 64, first lubrication circuit 52 and second lubrication circuit 53. Lubrication control valve 71 has a bi-circuit lubrication position shown in FIG. 3, in which first lubrication circuit 52 and second lubrication circuit 53 are allowed to transmit the lubricating oil discharged from second pressure regulating valve 64, to input clutch 4. In this position, spool 71a is urged by the biasing force of spring 71b onto a bottom of the spool bore. Lubrication control valve 71 also has a mono-circuit lubrication position shown in FIG. 4, in which only first lubrication circuit 52 is allowed to transmit the lubricating oil discharged from second pressure regulating valve 64, to input clutch 4. In this position, spool 71a is moved remote from the bottom of the spool bore against the biasing force of spring 71b. Here, a lockup control valve for lockup control of conventional torque converter transmissions may be used as lubrication control valve 71 for input clutch 4. Flow control member 52a is disposed within first lubrication circuit 52 and limits an amount of the lubricating oil passing through first lubrication circuit 52. Flow control member 52a defines an opening area of first lubrication circuit 52 through which a minimum amount of the lubricating oil passes through first lubrication circuit 52 for lubrication of input clutch 4. In this embodiment, flow control member 52a is in the form of an orifice.

Controller 62 is programmed to determine a required lubricating oil amount that is required for lubrication of input clutch 4 depending on an operating state of input clutch 4 as explained later. Lubrication control valve 71 is actuated by solenoid valve 72 to shift between the bi-circuit lubrication position and the mono-circuit lubrication position.

Controller 62 operates solenoid valve 72 so as to shift between OFF position and ON position. Solenoid valve 72 is supplied with constant pilot pressure Pp that is created by pilot valve 73 on the basis of transmission control pressure Ps as the initial pressure. When solenoid valve 72 is shifted to OFF position by controller 62, constant pilot pressure Pp is prevented from being applied to pressure-apply chamber 71c so that lubrication control valve 71 is moved to the bi-circuit lubrication position shown in FIG. 3. When solenoid valve 72 is shifted to ON position by controller 62, constant pilot pressure Pp is applied to pressure-apply chamber 71c so that lubrication control valve 71 is moved to the mono-circuit lubrication position shown in FIG. 4. Lockup control valves used for the torque converter transmission in the earlier techniques may be used as solenoid valve 72 and pilot valve 73.

Figure 5:
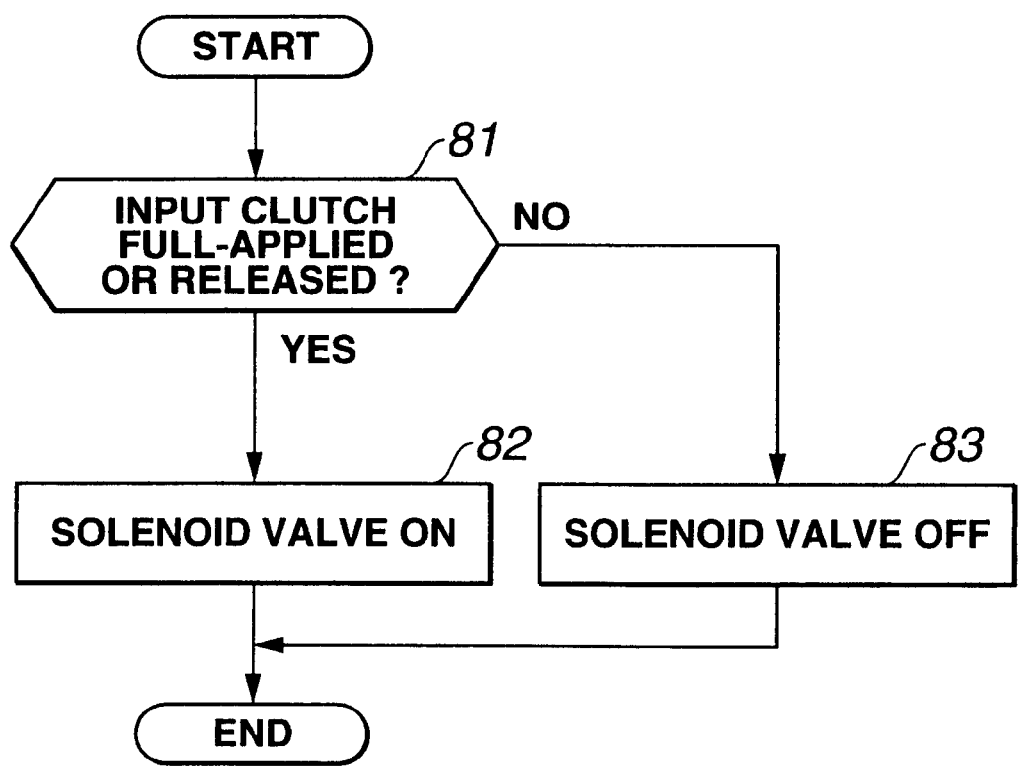
FIG. 5 is a flow chart showing a lubrication control program for the input clutch which is executed by a controller.

Referring to FIG. 5, a flow of the lubrication control executed by controller 62 is now explained.

Logic flow starts and goes to decision block 81 where an interrogation is made whether input clutch 4 is in the full-applied state or released state, or in the slipping state on the basis of an amount of electric current i supplied to electromagnetic clutch 28. If it is determined at decision block 81 that input clutch 4 is in the full-applied state or released state, the required lubricating oil amount for lubrication of input clutch 4 is determined as a minimum level and the logic goes to block 82. At block 82, the mono-circuit lubrication control is performed as follows. Solenoid valve 72 is moved to ON position where pilot pressure Pp is permitted to exert onto pressure-apply chamber 71c of lubrication control valve 71. Lubrication control valve 71 is then moved to the mono-circuit lubrication position where the lubricating oil is permitted to be transmitted to input clutch 4 via only first lubrication circuit 52 with orifice 52a. Input clutch 4 can be suitably lubricated by the minimally required lubricating oil amount. This can limit loss of the driving energy of oil pump 24 to a minimum level.

If it is determined at decision block 81 that input clutch 4 is in the slipping state, the required lubricating oil amount for lubrication in input clutch 4 is determined as a maximum level and the logic goes to block 83 where the bi-circuit lubrication control is performed. At block 83, solenoid valve 72 is moved to OFF position to prevent pilot pressure Pp from being applied to pressure-apply chamber 71c of lubrication control valve 71. Lubrication control valve 71 is moved to the bi-circuit lubrication position where the lubricating oil is permitted to be transmitted to input clutch 4 via both of first lubrication circuit 52 and second lubrication circuit 53. Input clutch 4 can be fully lubricated and therefore be prevented from wear and heat to be caused by less lubrication thereof.

As be apparent from the above explanation of the embodiment of the present invention., the lubrication of input clutch 4 can be readily conducted by selecting the mono-circuit and bi-circuit lubrication control.

First and second lubrication circuits 52 and 53 used for the mono-circuit and bi-circuit lubrication control are provided parallel to each other at the connection of input shaft 5 and sleeve 27 in which input shaft 5 is received into sleeve 27. Namely, first lubrication circuit 52 includes annular space 5a between the outer circumferential surface of input shaft 5 and the inner circumferential surface of sleeve 27. First lubrication circuit 52 fluidly communicates input clutch 4 with oil pump 24. Second lubrication circuit 53 includes axial bore 5b formed in input shaft 5. Second lubrication circuit 53 fluidly communicates input clutch 4 with oil pump 24. With the arrangement, it is not required to increase the diameter of input shaft 5. Therefore, the lubrication control of input clutch 4 can be readily performed without increasing the radial dimension of the automatic transmission.

Further, inlet and outlet fluid circuits for lockup control of conventional torque converter transmissions can be used without change of their designs as annular space 5a between input shaft 5 and sleeve 27 and axial bore 5b within input shaft 5, respectively. Annular space 5a in communication with input clutch 4 is used as a part of first lubrication circuit 52 for input clutch 4, and axial bore 5b in communication with input clutch 4 is used as a part of second lubrication circuit 53 therefor. In addition, a lockup control valve for lockup control of the conventional torque converter transmissions can be used as lubrication control valve 71 for lubrication control of input clutch 4. Accordingly, the lubrication control of input clutch 4 can be conducted by utilizing the inlet and outlet fluid circuits and the lockup control valve for lockup control for the conventional torque converter transmissions without substantially changing the design thereof. This can serve for providing the automatic transmission with the electromagnetic input clutch at low cost by utilizing the automatic transmission with the torque converter.

Furthermore, with the provision of flow control member 52$a$ within first lubrication circuit 52, the lubricating oil amount required for lubricating input clutch 4 can be suitably regulated during the mono-circuit lubrication control using first lubrication circuit 52.

Further, after completion of lubrication of input clutch 4, the lubricating oil can be collected by the plurality of oil catching ribs 55A uprightly extending from the inner surface of the lower portion of input clutch casing 51. The lubricating oil then can be permitted to enter into oil return passage 57 through opening 56 in input clutch casing 51 and return to oil pan 54. The lubricating oil returned to oil pan 54 can be surely used for subsequent lubrication of input clutch 4.

This application is based on Japanese Patent Application No. 2000-198263 filed on Jun. 30, 2000, the entire contents of which, inclusive of the specification, claims and drawings, are hereby incorporated by reference herein.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An input clutch lubrication control apparatus for au automatic transmission, comprising:
   an oil pump discharging a lubricating oil;
   a sleeve;
   an input shaft having an axial bore, the input shaft rotatably supported by the sleeve;
   an electromagnetic input clutch electromagnetically operated to be drivingly coupled with the input shaft upon being applied;
   a first lubrication circuit feeding the lubricating oil discharged from the oil pump to the electromagnetic input clutch, the first lubrication circuit including a space between an outer circumferential surface of the input shaft and an inner circumferential surface of the sleeve; and
   a second lubrication circuit feeding the lubricating oil discharged from the oil pump to the electromagnetic input clutch, the second lubrication circuit including the axial bore of the input shaft; and
   a controller programmed to control the first and second lubrication circuits to regulate an amount of the lubricating oil fed to the electromagnetic input clutch.

2. The input clutch lubrication control apparatus as claimed in claim 1, wherein the controller is programmed to determine a required lubricating oil amount required for lubricating the electromagnetic input clutch, depending on an operating state of the electromagnetic input clutch, the controller being programmed to use both of the first and second lubrication circuits when the required lubricating oil amount is a maximum, the controller being programmed to use only the first lubrication circuit when the required lubricating oil amount is a minimum.

3. The input clutch lubrication control apparatus as claimed in claim 1, further comprising a flow control member disposed within the first lubrication circuit, the flow control member limiting an amount of the lubricating oil passing through the first lubrication circuit.

4. The input clutch lubrication control apparatus as claimed in claim 3, wherein the flow control member comprises an orifice.

5. The input clutch lubrication control apparatus as claimed in claim 1, further comprising an oil pan receiving the lubricating oil which has lubricated the electromagnetic input clutch, and an input clutch casing enclosing the electromagnetic input clutch and formed with a plurality of oil catching ribs collecting the lubricating oil in a space defined therebetween.

6. The input clutch lubrication control apparatus as claimed in claim 5, wherein the plurality of oil catching ribs comprise upright ribs. radially extending from an inner peripheral surface of the input clutch casing and spaced from each other in a direction of rotation of the electromagnetic input clutch.

7. The input clutch lubrication control apparatus as claimed in claim 6, wherein the plurality of oil catching ribs comprise a connection rib connecting the adjacent two of the upright ribs.

8. The input clutch lubrication control apparatus as claimed in claim 5, further comprising an oil return passage transmitting the lubricating oil collected to the oil pan, the oil return passage comprising an opening formed in the input clutch casing.

9. An input clutch lubrication control apparatus for au automatic transmission, comprising:
   an oil pump discharging a lubricating oil;
   a sleeve;
   an input shaft rotatably received by the sleeve with a space therebetween, the input shaft having an axial bore;
   an electromagnetic input clutch electromagnetically operated to be drivingly coupled with the input shaft upon being applied;
   first lubrication passage means for fluidly communicating the electromagnetic input clutch with the oil pump through the space between the sleeve and the input shaft;
   second lubrication passage means for fluidly communicating the electromagnetic input clutch with the oil pump through the axial bore of the input shaft; and
   a controller programmed to control the first and second lubrication passage means depending on an operating state of the electromagnetic input clutch.

10. The input clutch lubrication control apparatus as claimed in claim 9, wherein the controller is programmed to determine a slipping state, a fully-applied state and a released state of the electromagnetic input clutch, the controller being programmed to use both of the first and second lubrication passage means in the slipping state of the electromagnetic input clutch, the controller being programmed to use only the first lubrication passage means in either one of the fully-applied state and the released state of the electromagnetic input clutch.

11. The input clutch lubrication control apparatus as claimed in claim 9, further comprising a flow control means for limiting an amount of the lubricating oil passing through the first lubrication passage means, the flow control means being disposed within the first lubrication passage means.

12. The input clutch lubrication control apparatus as claimed in claim 11, wherein the flow control means comprises an orifice.

13. The input clutch lubrication control apparatus as claimed in claim 9, further comprising an oil receiver receiving the lubricating oil which has lubricated the electromagnetic input clutch, and an input clutch casing which encloses the electromagnetic input clutch and includes a plurality of oil catching members collecting the lubricating oil in a space defined therebetween.

14. The input clutch lubrication control apparatus as claimed in claim 13, wherein the plurality of oil catching members comprise oil catching members radially extending from an inner peripheral surface of the input clutch casing and spaced from each other in a direction of rotation of the electromagnetic input clutch.

15. The input clutch lubrication control apparatus as claimed in claim 14, wherein the plurality of oil catching members comprise a connecting member connecting the adjacent two of the oil catching members.

16. The input clutch lubrication control apparatus as claimed in claim 13, further comprising an oil return passage transmitting the lubricating oil collected to the oil receiver, the oil return passage comprising an opening formed in the input clutch casing.

17. An automatic transmission, comprising:

an oil pump discharging a lubricating oil;

a sleeve;

an input shaft rotatably supported by the sleeve;

an electromagnetic input clutch electromagnetically operated to be drivingly coupled with the input shaft upon being applied;

first and second lubrication circuits fluidly communicating the electromagnetic input clutch with the oil pump and arranged parallel to each other; and a controller programmed to perform either one of a mono-circuit lubrication control in which the first lubrication circuit is used and a bi-circuit lubrication control in which the first and second lubrication circuits are used, depending on an operating state of the electromagnetic input clutch.

18. The automatic transmission as claimed in claim 17, wherein the controller is programmed to determine a required lubricating oil amount required for lubricating the electromagnetic input clutch, the controller performing the bi-circuit lubrication control when the required lubricating oil amount is a maximum, the controller performing the mono-circuit lubrication control when the required lubricating oil amount is a minimum.

19. The automatic transmission as claimed in claim 17, wherein the first lubrication circuit comprises an annular space formed between an outer circumferential surface of the input shaft and an inner circumferential surface of the sleeve, and the second lubrication circuit comprises an axial bore formed in the input shaft.

20. The automatic transmission as claimed in claim 19, further comprising a flow control member limiting an amount of the lubricating oil passing through the first lubrication circuit, the flow control member being disposed within the first lubrication circuit.

* * * * *